(12) United States Patent
Okuno et al.

(10) Patent No.: US 7,370,729 B2
(45) Date of Patent: May 13, 2008

(54) BREATHER DEVICE FOR SPEED-CHANGE DEVICES

(75) Inventors: Mitsutaka Okuno, Anjo (JP); Masahiro Hayabuchi, Anjo (JP); Masaaki Nishida, Anjo (JP); Satoru Kasuya, Anjo (JP); Nobukazu IKe, Anjo (JP)

(73) Assignee: Aisin AW Co., Ltd., Aichi-Ken (JP)

( * ) Notice: Subject to any disclaimer, the term of this patent is extended or adjusted under 35 U.S.C. 154(b) by 208 days.

(21) Appl. No.: 10/398,715

(22) PCT Filed: Jul. 2, 2002

(86) PCT No.: PCT/JP02/06686

§ 371 (c)(1),
(2), (4) Date: May 29, 2003

(87) PCT Pub. No.: WO03/004909

PCT Pub. Date: Jan. 16, 2003

(65) Prior Publication Data

US 2003/0188928 A1    Oct. 9, 2003

(30) Foreign Application Priority Data

Jul. 2, 2001    (JP) .............................. 2001-201506

(51) Int. Cl.
*F16H 57/04*    (2006.01)
(52) U.S. Cl. .................................... 184/6.23; 74/606 R
(58) Field of Classification Search ............... 184/6.23; 74/606 R, 607

See application file for complete search history.

(56) References Cited

U.S. PATENT DOCUMENTS

| 3,686,973 | A | * | 8/1972 | Davison et al. ........... 74/606 R |
| 3,722,321 | A | * | 3/1973 | Walker et al. ............ 74/606 R |
| 4,451,094 | A | * | 5/1984 | Martin ........................ 303/10 |
| 4,554,844 | A | * | 11/1985 | Hamano .................. 74/606 R |
| 4,595,118 | A | * | 6/1986 | Azuma et al. ......... 220/203.27 |
| 4,911,035 | A | * | 3/1990 | Taguchi .................... 74/606 R |
| 5,129,422 | A | * | 7/1992 | Davison et al. ........ 137/599.09 |
| 5,509,949 | A | * | 4/1996 | Gluys et al. ................ 55/385.3 |
| 5,650,677 | A | * | 7/1997 | Furukawa et al. ............ 310/88 |
| 5,724,864 | A | * | 3/1998 | Rodgers et al. ........... 74/606 R |
| 6,015,444 | A | * | 1/2000 | Craft et al. .................... 55/320 |
| 6,058,969 | A | * | 5/2000 | Bollwahn et al. ........... 137/583 |
| 6,263,749 | B1 | * | 7/2001 | Wesley ......................... 74/11 |

FOREIGN PATENT DOCUMENTS

DE    91 12 555 U1    12/1991

(Continued)

*Primary Examiner*—Chong H Kim
(74) *Attorney, Agent, or Firm*—Sughrue Mion, PLLC (57) ABSTRACT

In a breather device linking a space within a transmission case (1) to outside air, a breather (10) is provided at a middle position in a lengthwise direction on an upper portion of the transmission case, in particular, at a position displaced in an axial direction from a middle position in the lengthwise direction, and opens to outside air via a ventilating mechanism (2) that extends in a direction opposite this displaced direction. Thus, through the combination of displacement in a lengthwise direction of the position of the breather with respect to a middle portion in a lengthwise direction of the transmission case and the direction of the ventilating mechanism facing in a direction opposite that direction, the occurrence of breather blow is prevented during both forward and rearward axis tilting of the transmission by an action where a forward side of the ventilating mechanism lowers when, the position of the breather tilts in a direction away from the oil level, and conversely, where the forward side of the ventilating mechanism rises when the position of the breather tilts in a direction towards the oil level.

18 Claims, 9 Drawing Sheets

FOREIGN PATENT DOCUMENTS

| | | |
|---|---|---|
| JP | 57-65264 | 4/1982 |
| JP | 61 105369 A | 5/1986 |
| JP | 2-94963 | 7/1990 |
| JP | 07 280181 A | 10/1995 |
| JP | 09-273621 | 10/1997 |
| JP | 2000 266166 A | 9/2000 |
| JP | 2001021022 A * | 1/2001 |
| JP | 2001 065669 A | 3/2001 |

* cited by examiner

BREATHER DEVICE FOR SPEED-CHANGE DEVICES

TECHNICAL FIELD

The present invention relates to a breather device preventing the confinement of pressure in a space within a transmission case, and in particular, relates to an art that improves ventilation performance with respect to an inclination of the transmission mounted in a vehicle.

BACKGROUND ART

Conventionally, a breather device preventing the confinement of pressure within a transmission case, particularly in a vertically mounted transmission for front engine rear drive (FR) vehicles mounted in vehicles such as 4WD off-road vehicles, should prevent breather blow, and form a labyrinth structure within the transmission case, in which an exit side of the labyrinth structure is structured to open to outside air via a breather pipe through a breather plug provided on a front upper portion of the transmission case, on the assumption that large forward and rearward tilting occurs in the transmission case when the vehicle is traveling.

In recent years, improvement of the driving performance of 4WD off-road vehicles such as the above has been demanded, and a breather device capable of supporting travel under severe circumstances such as 45° slope roads is becoming necessary.

However, with a conventional breather device such as the above, the possibility remains that breather blow may be generated by the agitation of oil from a rotating member in an inner portion of the transmission during travel on a slope road, particularly travel down a slope road. Fundamentally changing the breather device could be considered as a solution to this breather blow, however, such a large change would invite huge cost increases. In addition, a solution to breather blow would inevitably be accompanied by an increase in the size of the transmission exterior such that mountability in a vehicle is worsened.

Hence, it is a primary object of the present invention to provide a breather device for a transmission realizable with minimum alterations to the conventional transmission case, that prevents breather blow during vehicle travel on steep slope roads. In addition, it is a further object of the present invention to enable the realization of preventing breather blow on a steep slope road without increasing the size of the transmission exterior in practice.

DISCLOSURE OF THE INVENTION

The above objects are achieved by a structure characterized in that a breather device links a space within a transmission case to outside air, in which a breather is provided in an intermediate position in a lengthwise direction on an upper portion of the transmission case.

In this structure, oil entering the breather due to excessive fluctuating forward and rearward tilting of the oil level during the tilting of the transmission in both forward and rearward directions, can be prevented by positioning the breather connected to the breather device at an intermediate portion in the axial direction of an upper portion of the transmission case. Accordingly, the occurrence of breather blow caused by oil entering the breather can be prevented during both forward and rearward tilting of the transmission.

In the above structure, the breather positioned at an intermediate position in an axial direction of the space within the transmission case displaced in a lengthwise direction from a middle position in the lengthwise direction, and opening to outside air via a ventilating mechanism extending in a direction opposite the direction of displacement is even more effective.

According to this structure, through the combination of displacement in a lengthwise direction of the position of the breather with respect to a middle portion in a lengthwise direction of the transmission case and the direction of the ventilating mechanism facing in a direction opposite that direction, the occurrence of breather blow is prevented during both forward and rearward tilting of the transmission by mutually supplementing actions where a forward side of the ventilating mechanism lowers when the position of the breather tilts in a direction away from the oil level, and conversely, where the forward side of the ventilating mechanism rises when the position of the breather tilts in a direction towards the oil level.

Further, in the above structure, it is possible to employ a structure in which the transmission case has a reinforcement rib including a wall demarcating a canal-shaped space in an inner portion extending an upper portion of a peripheral wall in a lengthwise direction and outwardly overhanging from the peripheral wall, with the breather opening to the canal-shaped space provided on a side wall of the reinforcement rib.

In this structure, oil entering the breather due to fluctuations in the oil level can be all the more reliably prevented because it is possible to set the height of the breather vertically higher than the position of a general peripheral surface of the transmission case. Moreover, shape changes of the transmission case are therefore not necessary.

Also, among any of the above structures, a structure in which the breather is positioned on an outer peripheral side of a non-rotating member of the shifting mechanism accommodated within the transmission case is also effective.

According to this structure, the non-rotating member of the shifting mechanism can all the more reliably prevent oil from entering the breather because it functions as a shielding mechanism of oil raked up by other rotating members.

In addition, among any of the above structures, a structure in which the ventilating mechanism is provided with a breather pipe connected to the breather is also possible.

In this structure, it is possible to structure a breather device that can prevent the occurrence of breather blow during both forward and rearward tilting of the transmission without practically changing the transmission case because the mutually supplementing breather blow preventive actions can be obtained by rendering the breather pipe, which is directly fixed to the breather, a ventilating mechanism.

Or, in any of the above structures, a structure in which the ventilating mechanism is provided integral to the transmission case and isolated from a space within the transmission case, and provided with a breather chamber linked to the space within the transmission case by the breather is also possible.

In this structure, the occurrence of breather blow during both forward and rearward tilting of the transmission can be even more reliably prevented because the breather chamber functions as a buffer space that hinders oil flow when it enters the ventilating mechanism through the breather. Also, the breather chamber is integral with the transmission case, therefore, the effect of providing the breather chamber can also be kept to a minimum.

Or, in any of the above structures, a structure in which the ventilating mechanism is provided with a breather chamber separate from the transmission case, and is linked to the space within the transmission case by the breather is also possible.

In this structure, the occurrence of breather blow during both forward and rearward tilting of the transmission can be even more reliably prevented because the breather chamber functions as a buffer space that hinders oil flow when it enters the ventilating mechanism through the breather. Also, the breather chamber is separate from the transmission case, therefore, substantial changes to the transmission case structure in connection with providing the breather chamber are not necessary.

In addition, in the structure provided with the breather chamber, employing a structure in which the breather chamber is rendered a space long in a lengthwise direction, and linked to the space within the transmission case with an end side thereof by the breather, and another end side opens to outside air via the breather pipe is even more effective.

In this structure, the occurrence of breather blow during both forward and rearward tilting of the transmission can be all the more reliably prevented because the breather chamber is long in a lengthwise direction and functions as a buffer space long in an inclined direction.

In any of the structures provided with the breather chamber, rendering the breather chamber a labyrinth structure that controls the oil flow within the chamber is all the more effective.

In this structure, the occurrence of breather blow can be even more effectively prevented because even in the case where oil has entered the ventilating mechanism through the breather due to excessively large forward and rearward tilting of the transmission, oil discharge to outside air in a ventilating state are inhibited by the labyrinth structure of the breather chamber.

In addition, the present invention is characterized in that the breather device linking the space within the transmission chamber to outside air, the breather device has a breather that links to a space within the case at a position offset in a direction from a middle position between a front wall and a rear wall of the transmission case that accommodates a shifting mechanism, and a ventilating mechanism that links to the breather and extends to a position offset, at the minimum, an identical amount in another direction from the middle position.

According to this structure as well, through the combination of offsetting in one direction from the position of the breather with respect to the middle position between the front wall and rear wall of the transmission case and the offset amount of the ventilating mechanism facing in a direction opposite that direction, the occurrence of breather blow is prevented during both forward and rearward tilting of the transmission by mutually supplementing actions where a forward side of the ventilating mechanism lowers when the position of the breather tilts in a direction away from the oil level, and conversely, where the forward side of the ventilating mechanism rises when the position of the breather tilts in a direction towards the oil level.

The above structures are particularly effective in the case where the transmission is a vertical mounted transmission in a vehicle with the case axis line facing a lengthwise direction of the vehicle.

BEST MODE FOR CARRYING OUT THE INVENTION

Hereafter, embodiments of the present invention will be described with reference to the accompanying drawings. FIGS. 1 to 5 are a breather device for a transmission according to a first embodiment of the present invention. As shown by the axial cross-section in FIG. 1, the breather device linking a space within a transmission case 1 to outside air is provided with a breather 10 opening to the space within the case in an intermediate position in an axial direction of an upper portion of the transmission case 1 connected to a torque converter housing not shown in front in the axial direction (left side in the figure), and an extension housing and a transfer for four-wheel-drive similarly not shown at the rear (right side in the figure). This breather 10 is positioned in an intermediate position displaced slightly rearward of a middle position in the axial direction of the space within the case, guides air to an appropriate location of the vehicle via a ventilating mechanism 2 extending in a direction opposite this displaced direction, i.e. in a forward direction, and opens to outside air through a vent mechanism such as a breather valve not shown.

The space within the case 1 referred to here is a space that accommodates all rotating members of a shifting mechanism, not shown, and accompanying friction members thereof. It encloses in a circumferential direction with a peripheral wall 11 of the transmission case 1, and encloses in a lengthwise direction with a front wall (normally structured with an oil pump fixed to a transmission case opening portion) 1A separating the transmission case 1 from the torque converter housing with an input shaft in a pierced state and a rear wall (normally structured with a rear wall integral to the transmission case 1) 1b separating the transmission case 1 from the extension housing or transfers for four-wheel-drive with an output shaft in a pierced state. This space is a hermetically sealed oil-tight space in which the shifting mechanism is built because it is an oil lubrication space for the shifting mechanism, and in practice, is cut off from outside air. Accordingly, an effective lengthwise direction length of the space within the case 1, which is an oil-tight space, is a length in the case axial direction with an end set as the front wall, and another end set as the rear wall as shown with a reference numeral L in FIG. 1, and the middle of this length becomes a middle position in a lengthwise direction of the space within the case 1.

In this embodiment, the transmission case 1 has a reinforcement rib 12 consisting of a wall demarcating a groove-shaped space C in an inner portion, extending to an upper portion of the peripheral wall 11 in a lengthwise direction and outwardly overhanging from the peripheral wall 11, in which the breather 10 opening to the groove-shaped space C is provided on a side wall 12a of the reinforcement rib 12, and an eibow-type breather plug 21 is fixed sidewise to this breather 10.

Figure 1:
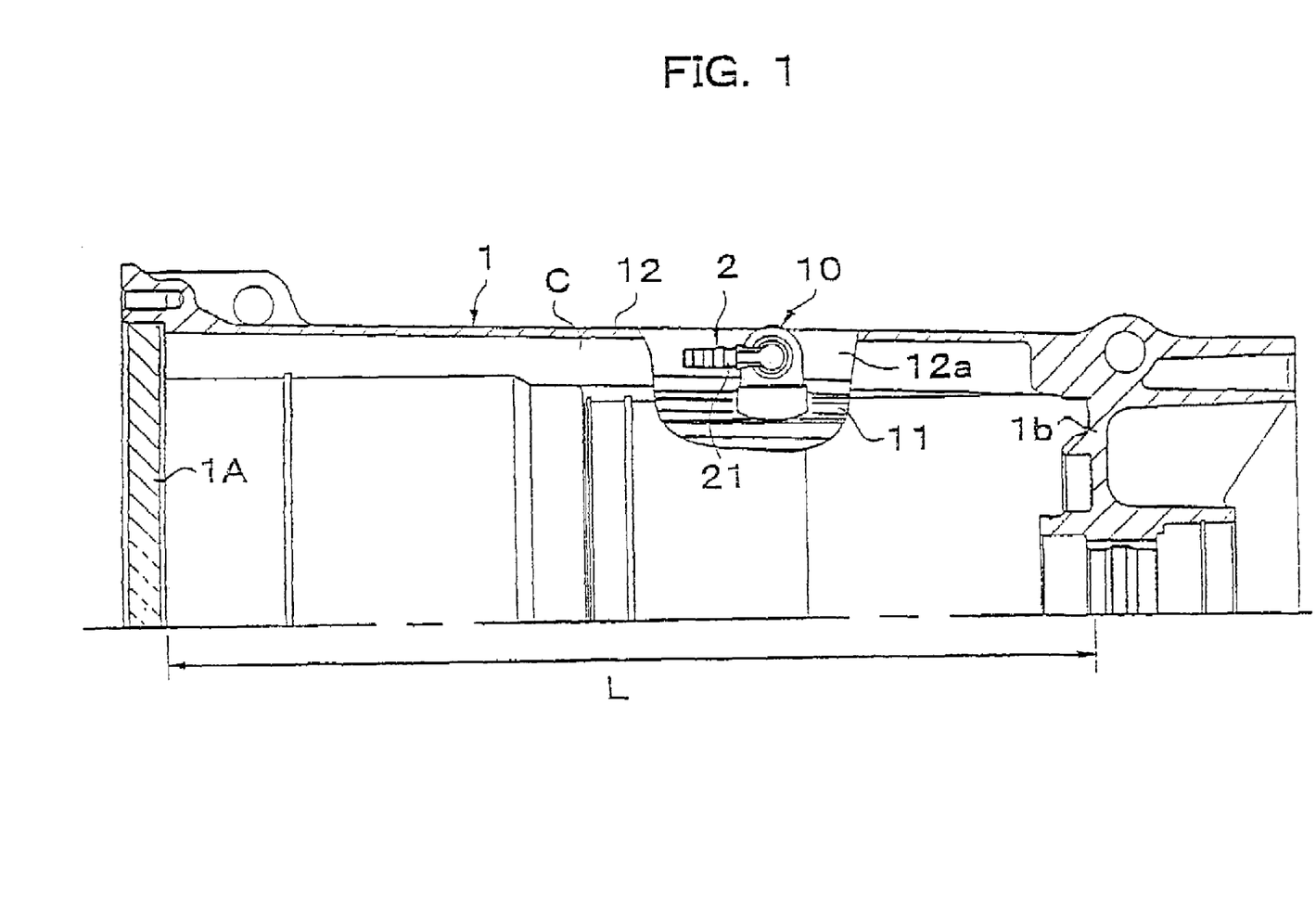
FIG. 1 is an axial cross-section of a transmission case to which a breather device for a transmission is applied according to a first embodiment of the present invention.
Figure 2:
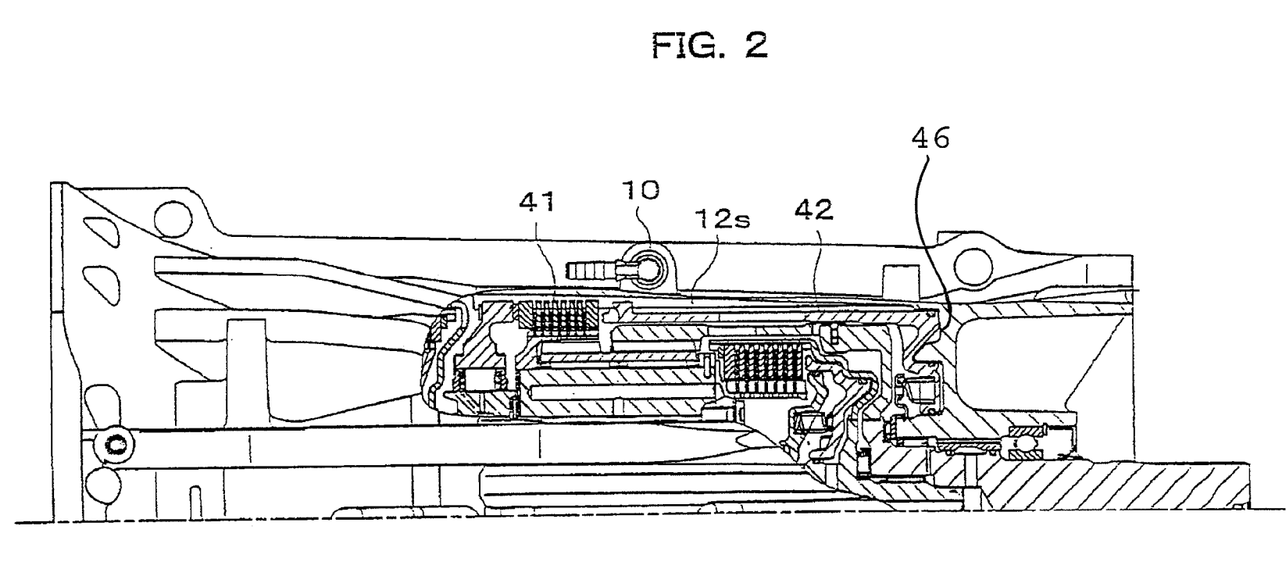
FIG. 2 is a side view of a section identical to FIG. 1 showing a relation between the breather device and a shifting mechanism according to the first embodiment in a partial cross-section.
Figure 3:
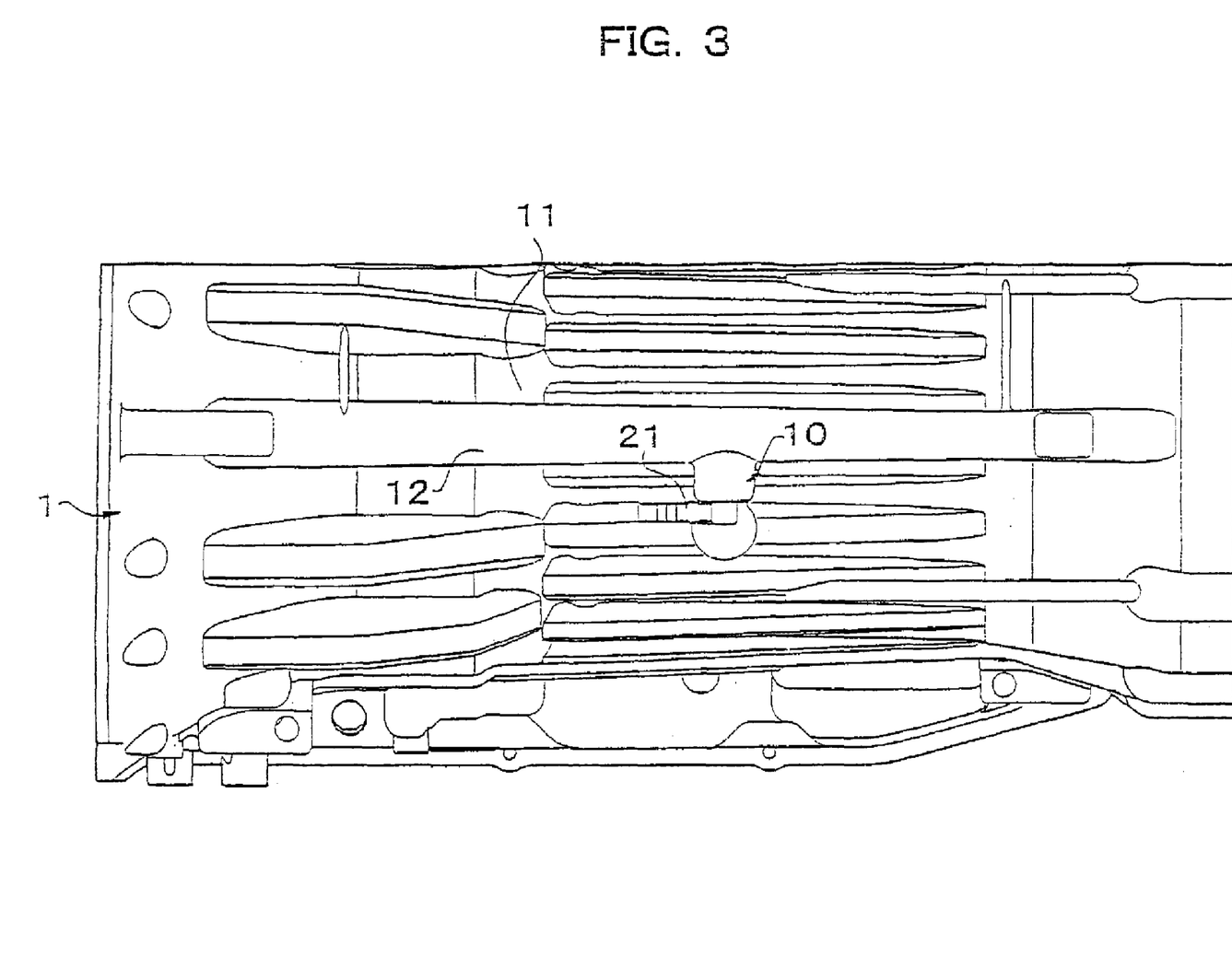
FIG. 3 is a plane view of the transmission case of the first embodiment.

Furthermore, non-rotating members of the shifting mechanism accommodated within the transmission case 1 such as, for example, a brake piston, and a fixed race of a one-way clutch, which are members supported unrotatably within the case 1, function as a shielding mechanism in the sense that the direct entry of oil raked up by the rotation of rotating members of the shifting mechanism within the transmission case 1 such as, for example, each component of a planetary gear, a clutch drum, and a rotation race of a one-way clutch, is prevented, and the above breather 10 is provided at a position at an outer peripheral wall thereof. In this embodiment, referring to FIG. 2, the extension tube portion of a brake piston 42 for an engagement operation with respect to a brake friction member 41, including a plurality of plates, positioned at a generally middle portion in an axial direction with an outer peripheral side secured and supported by an inner peripheral spline 12s of a peripheral wall of the transmission case 1, extends from a hydraulic servo cylinder 46 built into the rear wall of the case, with an end secured and fitted into by the spline 12s, and reaching to an end of the brake friction member 41. Therefore, the opening location of breather 10 is achieved at an axial position of the outer peripheral side of this extension tube portion. As shown in FIG. 2, the opening of the breather 10 is above the brake piston 42, at a location which is aligned with the brake piston 42 in a direction perpendicular to the axial direction of the case.

Figure 4:
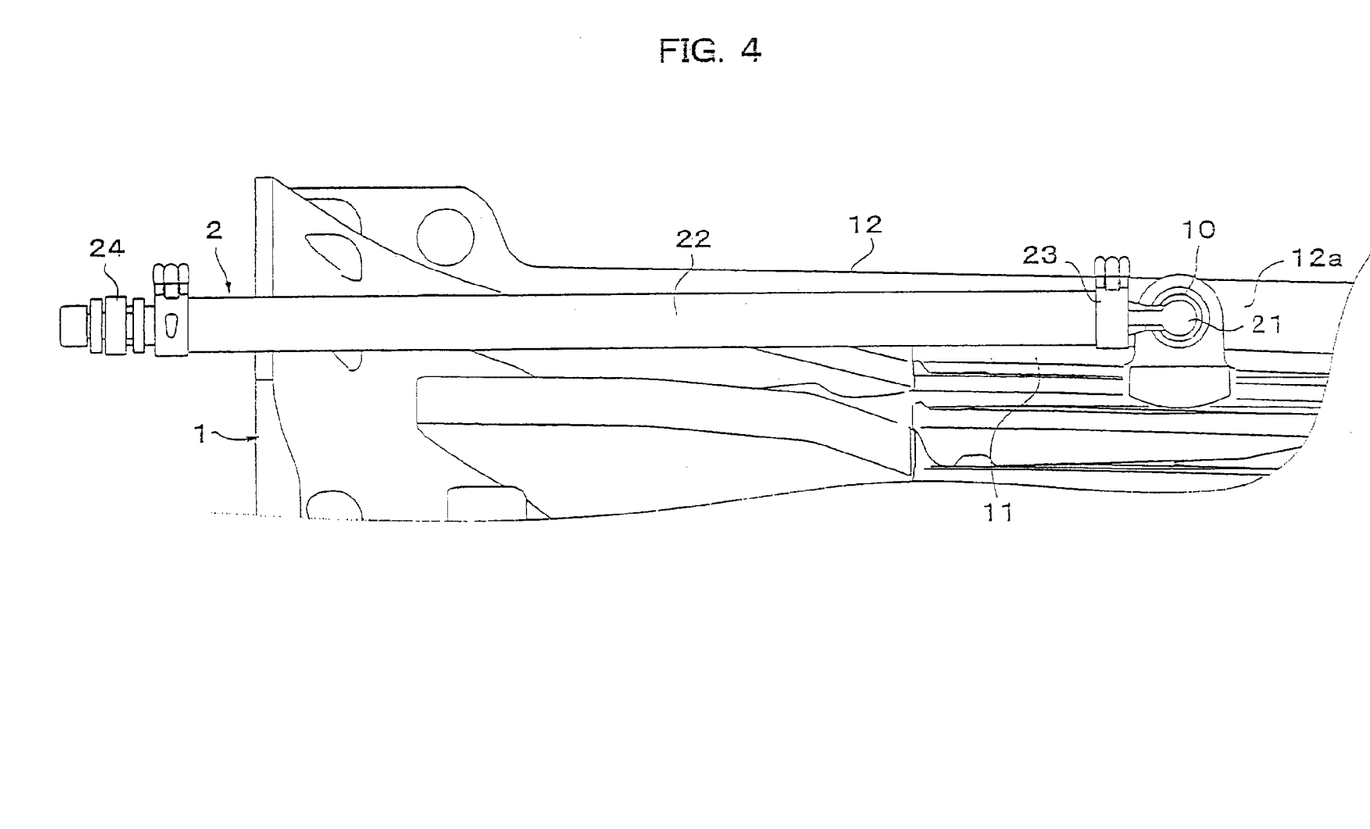
FIG. 4 is a partial side view of the transmission case of the first embodiment showing the breather device enlarged.
Figure 5:
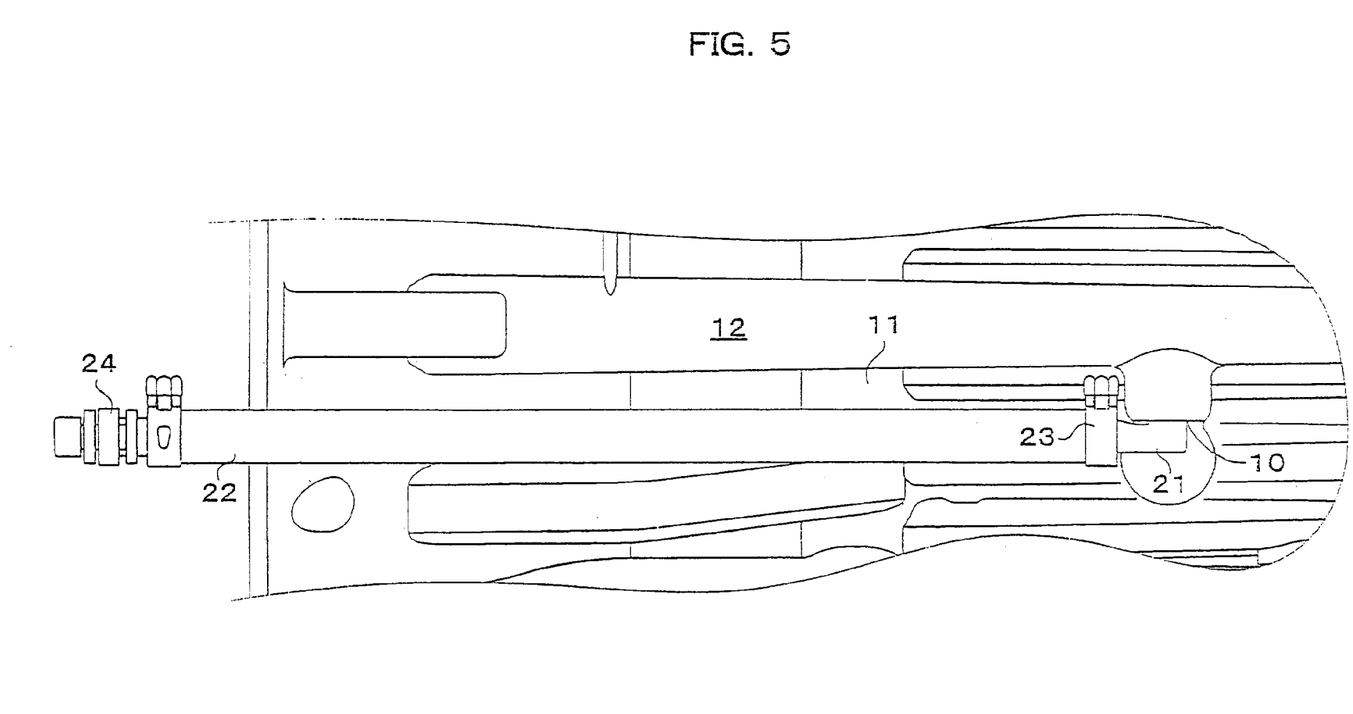
FIG. 5 is a partial plane view of the transmission case of the first embodiment showing the breather device enlarged.

As shown in FIGS. 4 and 5, the ventilating mechanism 2 in this embodiment is provided with the breather plug 21 of the breather 10, and a breather pipe 22 with an end connected to the breather plug 21, another end connected to vehicle-side piping, and thereby ultimately connected to the vent mechanism such as the breather valve via these connections. The breather plug 21 is rendered a freely rotatable swivel joint in a seal weld state around a horizontal axis line of the breather 10, and an end side is rendered a seal weldable hose connection shape inserted into the breather pipe 22. A connecting portion of the breather plug 21 and the breather pipe 22 is secured by tightening of a hose band 23 fitted on an outer periphery of the breather pipe 22. The breather pipe 22 extends in a generally horizontal forward direction along the reinforcement rib 12, and ends at an outer periphery position of the torque converter housing connected to the front side of the transmission case 1, and a joint 24 for vehicle side piping is fixed to the end portion.

In the breather device having such a structure, when the transmission case 1 tilts forward or backward due to the vehicle mounted with the transmission traveling on a steep slope road, it is possible to prevent oil from entering the breather 10 through fluctuations in oil level during tilting of the transmission in both forward and rearward directions, with the breather 10 connected to the breather device positioned at an upper intermediate portion of the transmission case 1. Accordingly, it is also possible to prevent the occurrence of breather blow due to oil entering the breather 10 during both forward and rearward tilting of the transmission. More specifically, when the transmission case 1 tilts forward, with the breather 10 at a position displaced rearward a predetermined amount, even if the oil level becomes as high as the front side, oil is prevented from entering the breather 10 because the margin of this displaced amount is ensured. On the contrary, when the transmission case 1 tilts rearward, the margin with respect to the height of the oil level is only the displaced amount of the breather 10 less than that during forward tilting. However, in this case, the front side of the breather pipe 22 is higher with respect to the position of the breather 10, therefore, even if oil were to enter the breather 10, the occurrence of breather blow can be prevented.

Furthermore, in this embodiment, since the breather 10 is provided on the side wall 12a of the reinforcement rib 12 consisting of a wall outwardly overhanging from the highest portion of the general peripheral wall 11 of the transmission case 1, the position of the breather 10 with respect to the oil level is higher without changing the shape of the transmission case 1, therefore, the possibility of the breather 10 drawing in oil becomes greatly reduced. In addition, there are no protrusions of the breather plug 21 and the breather pipe 22 from the maximum outer diameter of the transmission case 1 due to the sidewise arrangement of the breather 10 with respect to the side wall 12a of the reinforcement rib 12, and the mountability of the transmission in the vehicle is unharmed by the employment of this breather device.

Figure 6:
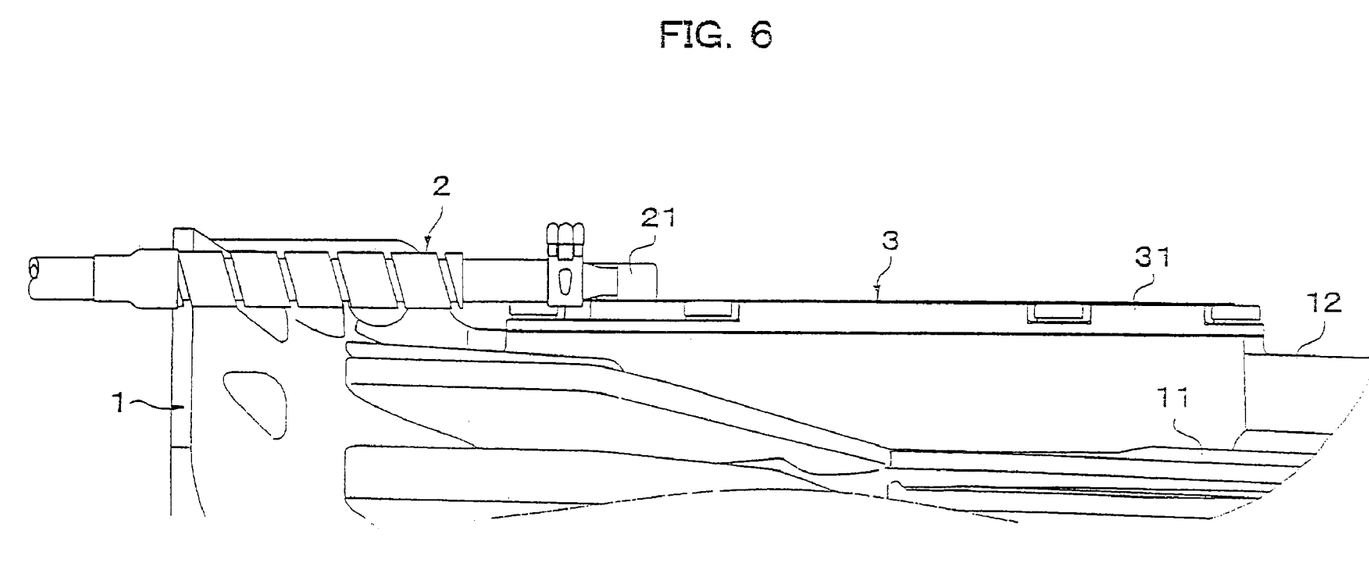
FIG. 6 is an enlarged partial side view of a transmission case showing a breather device of a second embodiment.
Figure 7:
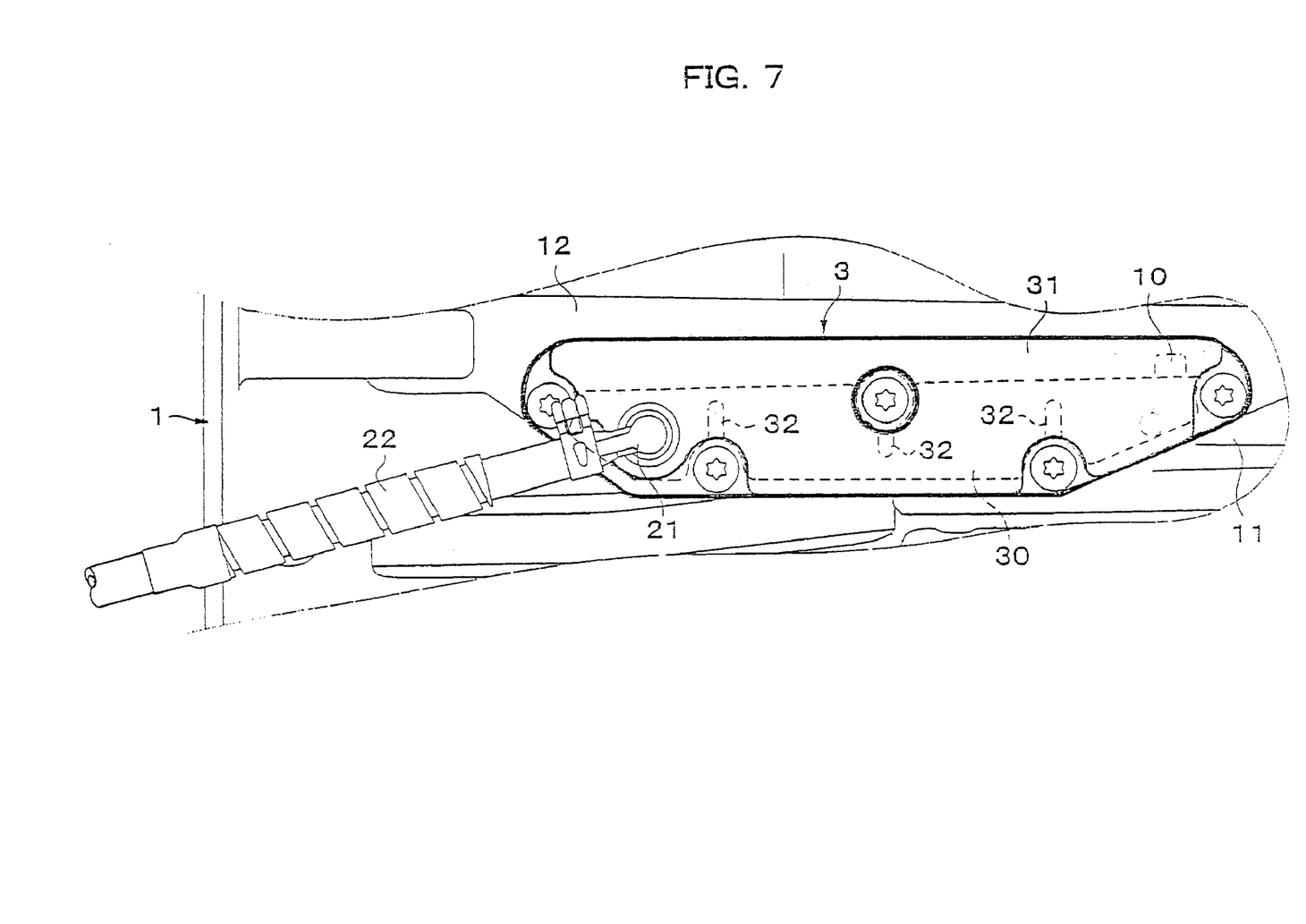
FIG. 7 is an enlarged partial plane view of the transmission case of the second embodiment.

Next, FIGS. 6 and 7 show a second embodiment of the present invention. This embodiment differs with respect to the previous first embodiment in that a breather chamber 3 accompanies a ventilating mechanism 2. The ventilating mechanism 2 in this embodiment is provided integral to the transmission case and isolated from a transmission case 1 and a space within the transmission case, and provided with the breather chamber 3 linked to the space within the transmission case by a breather 10 (see FIG. 7). The breather chamber 3, as shown with a flat shape in FIG. 7, is rendered a space long in a lengthwise direction and structured linking to the space within the transmission case by the breather 10 with an end side (rear side in the embodiment) thereof and another end side opens to outside air through a passage identical to the previous embodiment via a breather plug 21 and a breather pipe 22. In other words, with respect to the previous embodiment, a structure is used that disposes the breather chamber 3 between the breather 10 and the breather plug 21.

The breather chamber 3 is demarcated using a front portion of the reinforcement rib 12 of the transmission case 1 in the previous embodiment and has a space rendered generally oval from a top view with a height equivalent to a generally protruding amount of the reinforcement rib 12 from the transmission case general peripheral surface 11, and a width equivalent to the width of the reinforcement rib 12. However, it is arranged slightly offset in a left direction in the figure with respect to a center line of the reinforcement rib 12 due to the arrangement of the breather pipe 22. A bottom wall 30 of the breather chamber 3 is formed at a position approximately the same as the general peripheral wall 11 of the transmission case 1 such that it does not interfere with the arrangement of the mechanisms within the transmission case 1, and the breather 10 is formed in a rear portion of the bottom wall 30. In addition, an upper portion of thebreather chamber 3 is open and rendered a structure that can be closed by screwing of a lid 31. Further, the breather plug 21 is fixed to a front of the lid 31 by a method identical to the fixing of the breather plug 21 to the breather 10 in the previous embodiment. The breather chamber 3 is rendered a labyrinth structure that controls the flow of fluid within the chamber. In this embodiment, three vertical walls 32 disposed alternately with each other that structure the labyrinth structure are provided in a connected row arrangement configuration in a thick portion for screwing of the lid 31. A description of the position of the breather 10 in a lengthwise direction with respect to the transmission case 1, the direction of the breather pipe 22 with respect to this, and further piping after the breather plug 21 will be abbreviated because they are identical to the case of the previous first embodiment.

According to this embodiment as well, for reasons identical to the previous first embodiment, it is possible to prevent oil from entering the breather 10 due to fluctuations of the oil level during both forward and rearward tilting of the transmission, thus preventing the occurrence of breather blow. Furthermore, in the case of this embodiment, the breather chamber 3 is between the breather 10 and the breather plug 21, functioning as a buffer space that expands the fluid passage area, and furthermore, that space achieves a mechanism for inhibiting the flow of oil with the labyrinth structure, therefore, the occurrence of breather blow is all the more reliably prevented. Also, in this embodiment as well, since the breather chamber 3 is structured using an inner side of the reinforcement rib 12 that outwardly overhangs from the highest portion of the general peripheral wall 11 of the transmission case 1, the effectiveness of preventing breather blow can be all the more increased without substantial changes to the shape of the transmission case 1. In this case as well, protrusions of the breather chamber 1, breather plug 21, and the breather pipe 22 from the maximum outer diameter of the transmission case 1 are kept to a minimum, and the mountability of the transmission in the vehicle is unharmed by the employment of this breather device.

Figure 8:
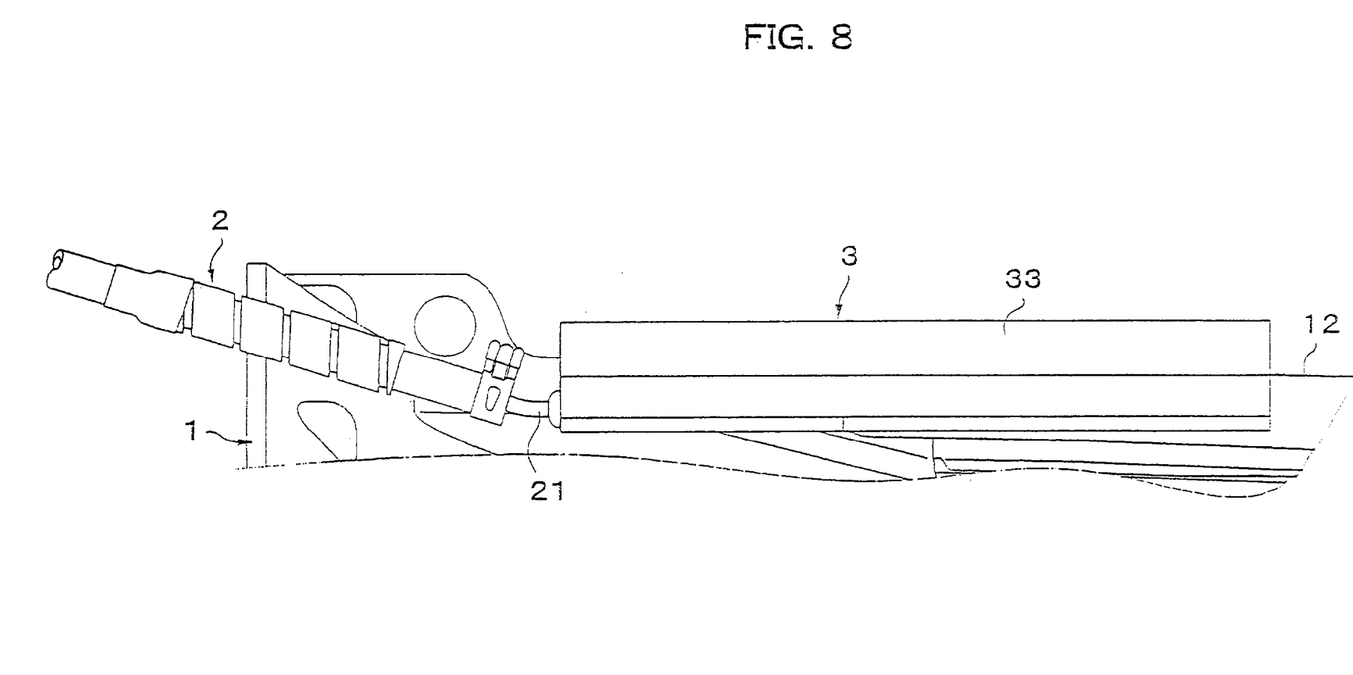
FIG. 8 is an enlarged partial side view of a transmission case showing a breather device of a third embodiment.
Figure 9:
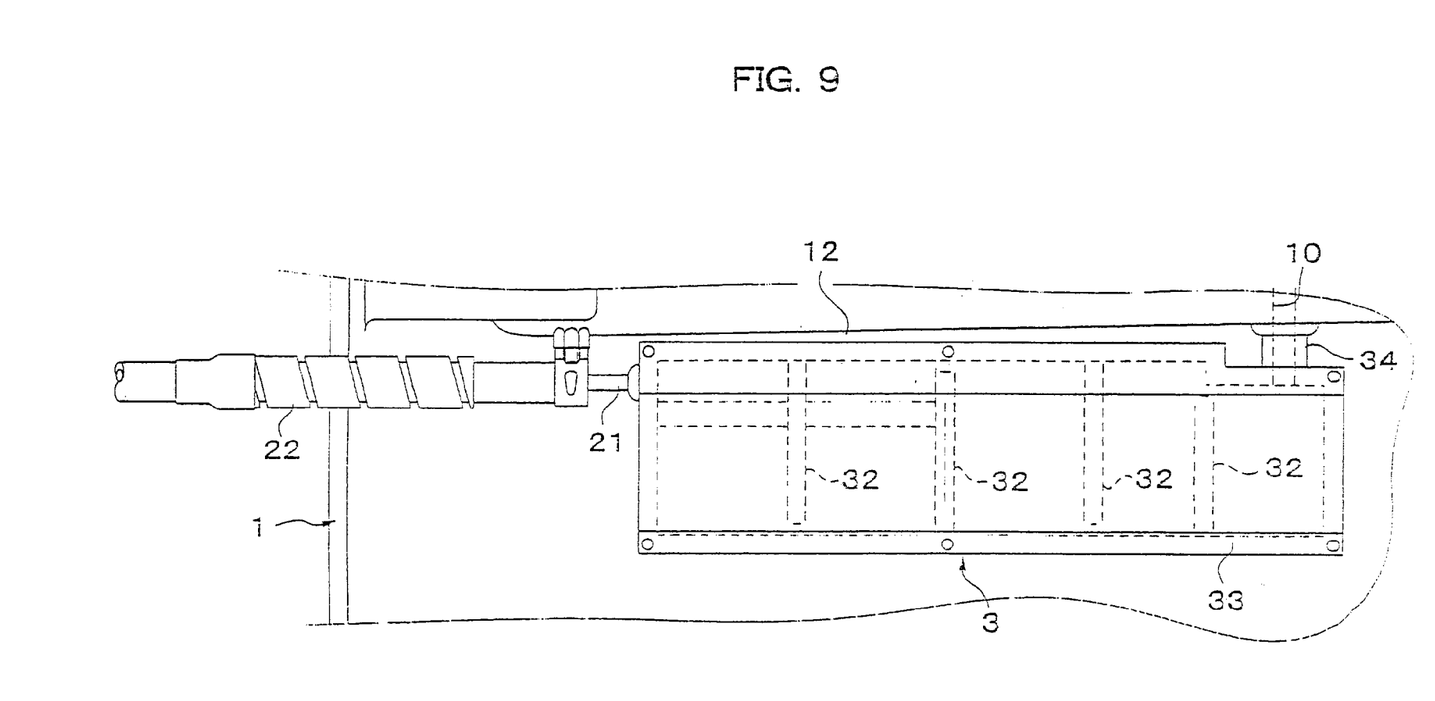
FIG. 9 is an enlarged partial plane view of the transmission case of the third embodiment.

Lastly, FIGS. 8 and 9 show a third embodiment of the present invention. This embodiment has a breather chamber 3 as a separate structure compared to the previous second embodiment. A ventilating mechanism 2 in this embodiment is provided with the breather chamber 3 separate from a transmission case 1, and linked to a space within the transmission case by a breather 10 (see FIG. 9). In this case as well, the breather chamber 3, as shown with a flat shape in FIG. 9, is rendered a space long in a lengthwise direction, in which it is linked to a space within the transmission case by the breather 10 with an end side (a rear side in the embodiment) thereof, and another end side (similarly, a front side) opens to outside air through a passage identical to the previous two embodiments via a breather plug 21 and a breather pipe 22.

The breather chamber 3 is provided along a side of a front side portion of a reinforcement rib 12 of the transmission case 1. In the case of this embodiment, there are few shape restrictions with it being separate from the transmission case 1, therefore, the breather chamber 3 is structured with a simple box-shaped body 33 in which a rear portion side wall thereof is a short pipe 34 that links it to a space within the reinforcement rib 12 by a breather 10 formed in a position identical to the first embodiment. In addition, the breather plug 21 is fixed to a front wall of the body 33, and the breather plug 21 in this case is rendered a ball joint shape to give more space than in the case of the previous second embodiment to the orientation of the breather pipe 22. Also, in this case as well, the breather chamber 3 has a labyrinth structure that controls the flow of fluid within the chamber. In this embodiment, four vertical walls 32 disposed alternately with each other that structure the labyrinth structure are respectively formed in shapes that extend from both side walls of the body 33 nearly to an opposing wall. A description of the position of the breather 10 in a lengthwise direction with respect to the transmission case 1, the direction of the breather pipe 22 with respect to this, and the further piping after the breather plug 21 will be abbreviated because they are identical to the cases of the previous first and second embodiments.

According to this embodiment as well, for reasons identical to the previous first and second embodiments, it is possible to prevent oil from entering the breather 10 due to fluctuations of the oil level during both forward and rearward tilting of the transmission, thus preventing the occurrence of breather blow. Furthermore, in the case of this embodiment, similar to the previous second embodiment, the breather chamber 3 is between the breather 10 and the breather plug 21, functioning as a buffer space that expands the fluid passage area, and furthermore, that space achieves a mechanism for inhibiting the flow of oil with the labyrinth structure, therefore, the occurrence of breather blow is all the more reliably prevented. Also, in this embodiment, the breather chamber 3 is separate from the transmission case 1, therefore, identical to the case of the first embodiment, practical shape changes to the transmission case 1 are unnecessary. Also, in the case of this embodiment, the position of the breather 10, identical to the case of the first embodiment, is on the side wall of the reinforcement rib 12, and the breather chamber 3 exerts an oil flow inhibiting effect identical to the case of the second embodiment, therefore, the effect on the exterior of the transmission case 1 is larger than both the previous embodiments, becoming a breather device having the breather blow prevention effect of the previous two embodiments.

Three embodiments have been described as examples for the sake of understanding the technical idea of the present invention, however, the present invention is not limited to the illustrated embodiments, and various changes can be implemented to specific structures of it which are within the scope of the items listed in the individual claims of the scope of the patent claims. In particular, with regard to the position setting of the breather 10 with respect to the transmission case 1, in each of the aforementioned embodiments, its setting was exclusively illustrated as displaced in a slightly rearward direction from a middle position, however, when employing a structure in which the ventilating mechanism 2 extends in a direction rearward of the transmission case 1, it is clearly preferable for the position of the breather 10 with respect to the transmission case 1 to be displaced in a somewhat forward direction from the middle position, and such a structure is naturally included in the range of the present invention.

INDUSTRIAL APPLICABILITY

The present invention can be widely applied to general transmissions, and more particularly, it is effective for use in automatic transmissions, specifically, in a vertically mounted transmission for front engine rear drive (FR) vehicles mounted in vehicles such as 4WD off-road vehicles.

What is claimed is:

1. A transmission having a case, with a shifting device and a breather device comprising:
   a breather which links a space within the transmission case to outside air, wherein the breather opens to a space within the transmission case at an intermediate position in an axial direction on an upper portion of the transmission case, such that the breather is displaced in a lengthwise direction from a middle position in the axial direction of the space within the case, and opens to outside air via a ventilating mechanism extending in a direction opposite the direction of displacement, a brake friction member including a plurality of plates accommodated within the case;

an inner spline extending from a peripheral wall of the case;

a hydraulic servo cylinder built into a rear wall of the case; and a brake piston with an extension tube portion, accommodated within the case, which is actuated so that the extension tube portion reaches an end of the brake friction member, the extension tube portion being extended from the hydraulic servo cylinder, and an end of the extension tube portion being secured by and fitted into the spline, wherein the breather opens to the space within the transmission case, on an outer side of the extension tube portion of the brake piston, and at a location which is aligned with the extension tube portion in a direction perpendicular to the axial direction.

2. The transmission having a case, with a shifting device and a breather device according to claim 1, wherein the transmission case has a reinforcement rib comprising a wall on an upper portion of a peripheral wall thereof extending in a lengthwise direction, which demarcates a groove-shaped space in an inner portion, outwardly overhanging from the peripheral wall, and the breather opening to the groove-shaped space is provided on a side wall of the reinforcement rib.

3. The transmission having a case, with a shifting device and a breather device according to claim 1, wherein the ventilating mechanism is provided with a breather pipe connected to the breather.

4. The breather device for a transmission according to claim 1, wherein the ventilating mechanism is provided integral to the transmission case and isolated from a space within the transmission case, and provided with a breather chamber linked to the space within the transmission case by the breather.

5. The breather device for a transmission according to claim 4, wherein the breather chamber is rendered a space long in a lengthwise direction, and is linked to the space within the transmission case with an end side thereof by the breather, and another end side opens to outside air via the breather pipe.

6. The breather device for a transmission according to claim 4, wherein the breather chamber is rendered a labyrinth structure that controls a flow of fluid within the chamber.

7. The breather device for a transmission according to claim 1, wherein the ventilating mechanism is provided with the breather chamber separate from the transmission case, and is linked to the space within the transmission case by the breather.

8. A breather device for a transmission according to claim 7, wherein the breather chamber is rendered a space long in a lengthwise direction, and is linked to the space within the transmission case with an end side thereof by the breather, and another end side opens to outside air via the breather pipe.

9. The breather device for a transmission according to claim 7, wherein the breather chamber is rendered a labyrinth structure that controls a flow of fluid within the chamber.

10. The transmission having a case, with a shifting device and a breather device according to claim 2, wherein the ventilating mechanism is provided with a breather pipe connected to the breather.

11. The breather device for a transmission according to claim 2, wherein the ventilating mechanism is provided integral to the transmission case and isolated from a space within the transmission case, and provided with a breather chamber linked to the space within the transmission case by the breather.

12. The breather device for a transmission according to claim 11, wherein the breather chamber is rendered a space long in a lengthwise direction, and is linked to the space within the transmission case with an end side thereof by the breather, and another end side opens to outside air via the breather pipe.

13. The breather device for a transmission according to claim 11, wherein the breather chamber is rendered a labyrinth structure that controls a flow of fluid within the chamber.

14. The breather device for a transmission according to claim 2, wherein the ventilating mechanism is provided with the breather chamber separate from the transmission case, and is linked to the space within the transmission case by the breather.

15. The breather device for a transmission according to claim 14, wherein the breather chamber is rendered a space long in a lengthwise direction, and is linked to the space within the transmission case with an end side thereof by the breather, and another end side opens to outside air via the breather pipe.

16. The breather device for a transmission according to claim 14, wherein the breather chamber is rendered a labyrinth structure that controls a flow of fluid within the chamber.

17. The transmission having a case, with a shifting device and a breather device according to claim 1, wherein the intermediate position is a position displaced in the lengthwise direction from the middle position in the axial direction of the space within the case.

18. The transmission having a case, with a shifting device and a breather device according to claim 1, further comprising a reinforcement rib that extends along a direction pointing from a front to a rear of the transmission case and has a side wall that faces in a widthwise direction of the transmission case, the breather extending from the side wall.

* * * * *